United States Patent
Odorici

[15] 3,657,649
[45] Apr. 18, 1972

[54] METER FOR MEASURING DIFFERENT RANGES OF ALTERNATING ELECTRICAL QUANTITIES

[72] Inventor: Roberto Odorici, Via Rutilia, Milan, Italy
[22] Filed: Nov. 20, 1970
[21] Appl. No.: 91,499

Related U.S. Application Data

[63] Continuation-in-part of Ser. No. 810,510, Mar. 26, 1969, abandoned.

[30] Foreign Application Priority Data

Apr. 4, 1968   Italy ................................. 14824 A/68

[52] U.S. Cl. ............................. 324/115, 324/119, 324/132
[51] Int. Cl. .................................... G01r 15/08, G01r 15/10
[58] Field of Search ......................... 324/115, 132, 131, 119

[56] References Cited

UNITED STATES PATENTS

| | | | |
|---|---|---|---|
| 2,294,065 | 8/1942 | Anderson | 324/119 |
| 3,041,535 | 6/1962 | Cochran | 324/132 X |

*Primary Examiner*—Rudolph V. Rolinec
*Assistant Examiner*—Ernest F. Karlsen
*Attorney*—Steinberg and Blake

[57] ABSTRACT

A meter for measuring alternating electrical quantities. The meter is particularly designed to provide readings of different ranges of these quantities on the same scale. An electrical circuit of the meter is provided with a pair of rectifiers which are connected in series, and a range changer coacts with one of the rectifiers for connecting it into and disconnecting it from the circuit when the range changes.

4 Claims, 4 Drawing Figures

INVENTOR.
ROBERTO ODORICI

BY

*Steinberg and Blake*
ATTORNEYS

METER FOR MEASURING DIFFERENT RANGES OF ALTERNATING ELECTRICAL QUANTITIES

CROSS REFERENCE TO RELATED APPLICATION

This application is a continuation-in-part of application Ser. No. 810,510, filed Mar. 26, 1969 now abandoned, and entitled METER FOR THE MEASUREMENT OF ELECTRICAL QUANTITIES.

BACKGROUND OF THE INVENTION

The present invention relates to meters.

In particular, the present invention relates to meters for measuring alternating electrical quantities.

The present invention is especially concerned with meters for changing the ranges of the electrical quantities, while utilizing the same scale.

As is well known, certain advantages are to be derived from devices which permit different ranges of an electrical quantity to be read on the same scale. For example, it is known to provide meters of this general type with a suitable switch enabling the range of the meter to be doubled, for example. Thus, a scale having graduations from 0 to 35, can be changed to 0 to 70. Such adjustments of conventional meters does not change the internal resistance thereof, and thus the conditions of operation of the electrical circuit of the measuring system does not change. However, such doubling of the range is applicable only to instruments where linear scales are provided, since the meters act on galvanometric constants which are divided by two, three, etc., where the change is a linear function of the current which passes through the moving coil of the instrument.

In general, however, such linear scales are used only in circuits which measure direct currents. Linear scales cannot be used with alternating current quantities, because the operation of meters of this type depends not only upon the efficiency of the components of the meter but also upon root mean square values. Thus, difficulties are encountered with meters of this latter type in bringing about effective doubling, tripling, or other multiples of the ranges.

In meters which have a moving coil and which are designed to measure alternating electrical quantities, alternating current in particular, the current is rectified into a direct current by inserting into the electrical circuit of the meter, in series with the coil thereof, a rectifying device, such as, for example, a diode.

Thus it is clear that the reading is carried out on a non-linear scale.

If, for example, the range is to be doubled, then it is known to introduce into the circuit a suitable resistor. However, the result is that the meter will then operate with an unavoidable inaccuracy inasmuch as the characteristic curve of the electrical system resulting from the insertion of the resistor does not coincide with the characteristic curve of the system without the resistor.

In other words, the circuit which includes the rectifier has a characteristic curve determined by the relationship between the current and the voltage. When the circuit is altered by introduction of an impedance, for example, there is a new curve, or, more precisely, the original characteristic curve is altered to a different configuration and location reflecting the new relationship between the current and voltage.

Thus, if in particular the case is considered where the range of the instrument is doubled, by introduction of a suitable range-doubling device, then the effect of altering the voltage-current characteristic curve necessitate that the readings be taken from a scale which is different from the scale used before doubling was effected. Completely different graduations are required for both cases. The result is that the reading of the meter becomes undesirably complicated since an individual using the meter must exert great care to make certain that the proper scale is consulted.

SUMMARY OF THE INVENTION

It is accordingly a primary object of the present invention to provide a meter which will avoid the above drawbacks.

In particular, it is an object of the present invention to provide a meter of the above general type capable of utilizing a non-linear scale for different ranges in the measurement of an alternating electrical quantity.

A more detailed object of the present invention is to provide a meter with a construction which will enable the range to be changed in the measurement of alternating electrical quantities, while at the same time maintaining substantial coincidence between the characteristic curves of voltage-current relationships for the different ranges.

In accordance with the invention the meter provided for measuring alternating electrical quantities has an electrical circuit which includes first and second rectifier means which are connected in series with each other and with a moving coil. The second rectifier means, in the form of a diode, for example, and in series with the first rectifier means, also in the form of a diode substantially identical with the diode which forms the second rectifier means, is placed by a range-changing means into or removed from the electrical circuit, whenever the range is changed. According to the invention there are two possibilities. The second rectifier means may be substantially identical with the first rectifier means, or the second rectifier means can be connected in parallel with a resistor connected into and separated from the electrical circuit by the range-changing means together with the second rectifier means so as to approach more closely characteristic curves of voltage-current relationships which are substantially coincident.

BRIEF DESCRIPTION OF DRAWINGS

The invention is illustrated by way of example in the accompanying drawings forming part of this application and in which.

DESCRIPTION OF PREFERRED EMBODIMENTS

Figure 3:
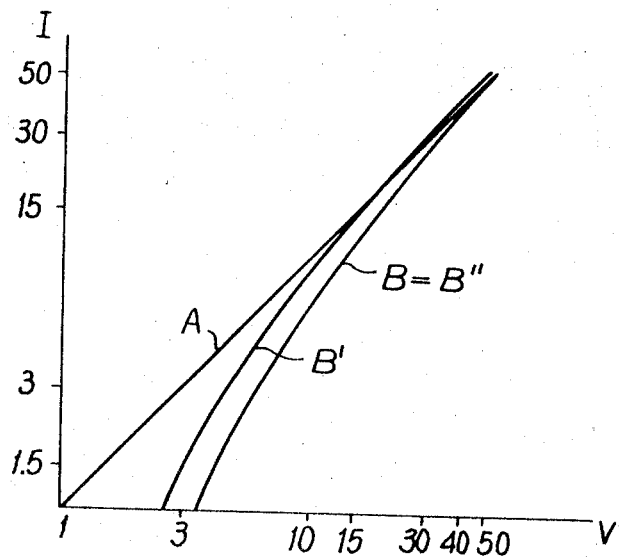
FIG. 3 is a graph illustrating the characteristic curves.

Referring first to FIG. 3, the graph illustrated therein has the abscissa provided with a logarithmic scale of voltages while the ordinate has a logarithmic scale of current values. In FIG. 3 the straight line A is a curve representing the linear function illustrating the relationship between voltage and current when the meter is used in a direct current circuit. Under these conditions if the voltage range is doubled, for example, as by insertion of a suitable resistor without altering the value of the total internal resistance, there will be only a doubling of the voltage constant without any change in the curve, so that under these conditions the range can be doubled, for example, without any sacrifice of precision.

Figure 4:
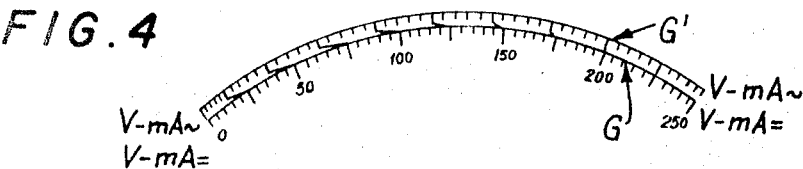
FIG. 4 shows a pair of meter scales, one used for measuring direct or linear electrical quantities, while the other is used for measuring alternating electrical quantities.

The curve B shown in FIG. 3 is illustrative, on the other hand, of a non-linear function of the relationship between the voltage and current of a meter circuit which includes a moving coil. This curve B is determined in accordance with the internal resistance of the circuit diode which is used to rectify the current as well as the resistance of the diode resulting from its series connection with the meter. It is apparent, therefore, that the scale of the meter cannot have uniformly spaced graduations for reading alternating current values, and therefore a scale as shown in FIG. 4 is provided for the meter. The lower scale G of FIG. 4 represents graduations for direct current readings, and it will be noted that these graduations are uniformly distributed along the scale. On the other hand, the scale G' is the scale which is used for reading alternating electrical quantities, in accordance with the curve B of FIG. 3, and it will be noted that as the scale G' progresses from the right toward the left, as viewed in FIG. 4, the graduations which correspond to those of the direct current scale G become gradually displaced at increasing distances from each other so that the lines connecting the major graduations of the two scales become increasingly longer from the right toward the left, as viewed in FIG. 4. In this way the scale G' takes into account the curvature of the characteristic of the diode. Thus, while the curve B gradually approaches the curve A, there is an initial compression at the lower part of the scale with the difference between the curves A and B gradually diminishing as the voltage increases so that for this reason the graduations are crowded together at the lower end of the scale G', as compared with the scale of direct current values G, with these graduations becoming gradually spread apart until they substantially approach the distribution of the graduations of the scale G.

Assuming now that the range of the scale is to be doubled, in the case of measurement of alternating electrical quantities, then of course the ideal situation is achieved when the curve for the doubled alternating quantities coincides with the curve B representing the non-doubled quantities. In actual practice whent the range is doubled the characteristic curve is altered, and this altered curve is represented by the curve B' in FIG. 3. Therefore, the ideal situation is one where the curves B and B' coincide. The curve B' with the conventional meters will differ substantially from the curve B, as a result of the substantial changes in the circuit resulting from the doubling of the range. It is for this reason that a completely separate scale is usually required for readings with a characteristic curve B' where the range is changed, and of course all of the disadvantages resulting from the use of different scales for different ranges are present, as pointed out above. With the present invention, however, this disadvantage is avoided.

With the present invention when the range is doubled, instead of a curve B' which will be provided with conventional meters there is provided a curve B'' which coincides with the curve B, as indicated in FIG. 3.

This advance is achieved with the invention by establishing for the doubled range the same conditions as those which obtain with the original range. Basically, this result is achieved with the invention by connecting into the circuit, when the range is doubled, a second diode which is in series with the first.

Figure 1:
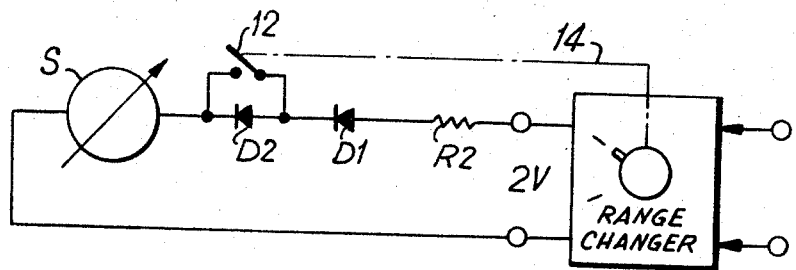
FIG. 1 is a wiring diagram showing the circuit of a meter according to one embodiment of the invention.

Referring to the embodiment of FIG. 1, the meter circuit illustrated therein includes the moving coil S which in a known way causes the scale pointer, schmetically represented in FIG. 1, to move along the scales G and G' of FIG. 4. The circuit includes the diode D1 which functions when the range is not doubled during the measurement of alternating electrical quantities, so that through the diode D1 the characteristic curve B of FIG. 3 is achieved. The circuit also includes the resistor R2 and the terminals connected across a voltage source of 2V, as illustrated, with these terminals connected to the schmetically illustrated range changer 10 which is in turn connected to the voltage source.

In accordance with the invention the circuit also includes the diode D2 connected in series with the diode D1. This diode D2 is bypassed by a bypass switch 12 mechanically connected with the range changer 10, as schmetically represented by the dot-dash line 14. The range changer 10 is shown in FIG. 1 in the position it takes when the second rectifier means formed by the diode D2 is connected into the circuit in series with the first rectifier means D1, for the purpose of doubling the range. Thus, at this time the range changer acts through the connection 14 to open the switch 12. When the range changer is adjusted to provide the original non-doubled range, the switch 12 is automatically closed so that the diode D2 is removed from the circuit, and thus at this time the circuit will operate only with the diode D1. Thus, with the meter of the invention the second rectifier means D2 is inserted into the circuit simultaneously with doubling of the range thereof and is removed from the circuit simultaneously with return of the circuit to its initial range. The characteristics of the diode D2 are carefully chosen so that when it is in the circuit the curve B'' will coincide with the curve B.

Figure 2:
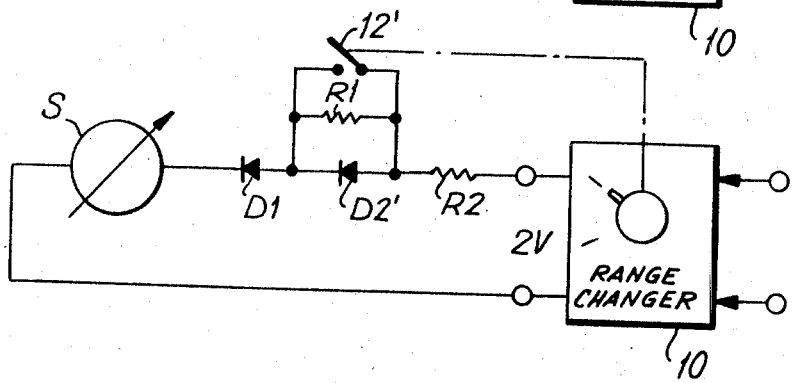
FIG. 2 is a wiring diagram showing the circuit of a meter according to a second embodiment of the invention.

In the embodiment of FIG. 2 the second rectifier means D2' may be assumed to have characteristics which will prevent the curve B'' from coinciding with the curve B to the desired extent. In order to bring these curves into coincidence the diode D2' is connected in parallel with a resistor R1, and the bypass switch 12' of FIG. 2 corresponds to the switch 12 of FIG. 1 and is connected in the same way to the range changer 10. Otherwise the embodiment of FIG. 2 is identical with that of FIG. 1. Thus, with the embodiment of FIG. 2, when the range is to be doubled, the range changer 10 will be manipulated to open the switch 12', thus inserting the diode D2' and the parallel-connected resistor R1 into the circuit. On the other hand, when the original range is to be used, the range changer 10 of FIG. 2 is manipulated to close the switch 12', thus bypassing the diode D2 and the resistor R1, so that the latter components are effectively removed from the circuit.

Thus, with the invention it is possible to use the single scale G' both for the original range, and for the doubled range, and the same set of graduations will function for both purposes. Of course, the characteristics of the second diode need not by identical with that of the first, and if necessary the resistor R1 can be used to achieve the desired coincidence between the curves B and B''.

In actual practice, the arrangement of the invention has resulted in achievement of a coincidence between the curves B and B'' to such an extent that the deviation therebetween is less than 0.5 percent.

I claim:

1. In a meter apparatus for measuring alternating electrical quantities and for reading different ranges of said quantities on the same scale, a range changing means having input terminals for accepting a signal under test and output terminals to provide a signal within selected value limits, electrical circuit means including first and second rectifier means connected in series with each other responsive to the output of the range changing means to compensate for errors induced as a result of changing ranges, meter means responsive to the output of said electrical circuit means and means operatively connected with said range changing means for rendering effective or ineffective at least one of said rectifier means when said range changing means is operated.

2. The combination of claim 1 and wherein said first and second rectifier means are substantially identical.

3. The combination of claim 1 and wherein a resistor is connected in parallel with said second rectifier means, for more closely approaching coincidence between a characteristic curve corresponding to operation with said first rectifier means alone and operation with both of said rectifier means in the circuit, and said range-changing means being operatively connected both with said resistor and said second rectifier means for connecting them together into or disconnecting them together from said circuit.

4. The combination of claim 1 and wherein the meter means includes moving-coil indicating means, and an indicator scale coacting with said indicating means for giving readings of the alternating electrical quantities, said range-changing means coacting with at least one of said rectifier means for changing the range of the quantities read on said scale.

* * * * *